US012244635B1

(12) United States Patent
Bonfield et al.

(10) Patent No.: US 12,244,635 B1
(45) Date of Patent: Mar. 4, 2025

(54) COMPUTER-BASED SYSTEMS CONFIGURED FOR NETWORK CHARACTERIZATION AND MANAGEMENT BASED ON RISK SCORE ANALYSIS AND METHODS OF USE THEREOF

(71) Applicant: Virtualitics, Inc., Pasadena, CA (US)

(72) Inventors: Charles Joseph Bonfield, Raleigh, NC (US); Jae Gook Ro, Chantilly, VA (US); Brandon Lee Knight, South Lake Tahoe, CA (US); Sarthak Sahu, Pasadena, CA (US); Ciro Donalek, Pasadena, CA (US); Michael Amori, Pasadena, CA (US)

(73) Assignee: Virtualitics, Inc., Pasadena, CA (US)

( * ) Notice: Subject to any disclaimer, the term of this patent is extended or adjusted under 35 U.S.C. 154(b) by 0 days.

(21) Appl. No.: 18/785,813

(22) Filed: Jul. 26, 2024

Related U.S. Application Data

(60) Provisional application No. 63/649,141, filed on May 17, 2024.

(51) Int. Cl.
*H04L 9/40* (2022.01)
(52) U.S. Cl.
CPC .................. *H04L 63/1433* (2013.01)
(58) Field of Classification Search
CPC ..................................... H04L 63/1433
See application file for complete search history.

(56) References Cited

U.S. PATENT DOCUMENTS

| 8,555,388 | B1 * | 10/2013 | Wang | H04L 69/22 |
| | | | | 713/188 |
| 9,747,570 | B1 * | 8/2017 | Vescio | G06Q 10/0635 |
| 2006/0272011 | A1 * | 11/2006 | Ide | H04L 63/1433 |
| | | | | 726/5 |
| 2018/0124091 | A1 * | 5/2018 | Sweeney | G06F 21/554 |

(Continued)

FOREIGN PATENT DOCUMENTS

| CN | 107347074 | A | * | 11/2017 | | H04L 63/105 |
| CN | 112291232 | A | * | 1/2021 | | G06F 16/2462 |

(Continued)

OTHER PUBLICATIONS

Wang et al. CN 116800548 A. English translation. (Year: 2023).*
Tang et al. CN 112291232 A. English translation (Year: 2021).*

*Primary Examiner* — Sarah Su
(74) *Attorney, Agent, or Firm* — GREENBERG TRAURIG, LLP

(57) ABSTRACT

A method includes scanning a plurality of hosts in a network to obtain risk information of each instance of vulnerability associated with each host during a period, calculating a vulnerability risk score (VRS) for each instance of the vulnerability based on the associated risk information, determining a number of vulnerabilities associated with each of the plurality of hosts during the period, obtaining a criticality score of each of the plurality of hosts, obtaining for each host, a representative VRS based at least in part on the VRS for each instance of vulnerability associated with the host, calculating a host risk score (HRS) for each host based on the representative VRS, the number of vulnerabilities and the criticality score of the host, calculating a network risk score (NRS) for the network based on the HRSs, and facilitating a security action based on the HRS for each host and the NRS.

30 Claims, 9 Drawing Sheets

(56) References Cited

U.S. PATENT DOCUMENTS

| | | | | |
|---|---|---|---|---|
| 2019/0289029 A1* | 9/2019 | Chawla | ............... | H04L 63/1425 |
| 2020/0412757 A1* | 12/2020 | Siddiq | ..................... | H04L 63/20 |
| 2022/0046045 A1* | 2/2022 | Rao | ....................... | G06F 21/577 |
| 2022/0046048 A1* | 2/2022 | Koo | .................... | H04L 63/1433 |
| 2022/0060509 A1* | 2/2022 | Crabtree | ............. | H04L 63/1433 |
| 2023/0047450 A1* | 2/2023 | Koo | ......................... | G06N 3/08 |

FOREIGN PATENT DOCUMENTS

| | | | | | |
|---|---|---|---|---|---|
| CN | 116800548 A | * | 9/2023 | | |
| EP | 3220595 A1 | * | 9/2017 | ........... | G06F 16/951 |
| WO | WO-2023064007 A1 | * | 4/2023 | ............. | G06F 21/53 |

* cited by examiner

Vulnerability Summary (CVE-2024-21338)

Windows Kernel Elevation of Privilege Vulnerability

Vulnerability Risk Score ⓘ
84
Severity: Critical
Num. Affected Hosts: 2,500
Num. Linked Threats: 13

CVSS v3 Base Score ⚠
7.8
CNA: Microsoft Corporation
Base Vector:
CVSS:3.1/AV:L/AC:L/PR:L/
UI:N/S:U/C:H/I:H/A:H

Patchable? ⌄
Yes
Publication Date:
2/13/2024

NVD Publication Date ⓘ
2/13/2024
Last Modified: 3/4/2024

ⓘ Recommended Action

Send list of affected hosts to patch management team for immediate remediation

Leaving this vulnerability (CVE-2024-21338) unpatched poses high risk to network security. Click "Send Hosts" to route the list of affected hosts to expedite patching efforts.

[Send Hosts]

[Show less]

FIG. 2

At-Risk Hosts (Location A)

| Host ID | Host IP | Host Type | Host Type Confidence | Host Risk Score | Host Criticality Score |
|---|---|---|---|---|---|
| X | 123.4.5.12 | Workstation | 98 | 89 | 64 |
| Y | 123.4.5.13 | Workstation | 94 | 74 | 72 |
| Z | 123.4.5.14 | Workstation | 73 | 53 | 87 |
| 8 | 123.4.5.91 | Server | 100 | 38 | 97 |

Rows per page: 10 ▼  1 – 10 of 150

FIG. 6

COMPUTER-BASED SYSTEMS CONFIGURED FOR NETWORK CHARACTERIZATION AND MANAGEMENT BASED ON RISK SCORE ANALYSIS AND METHODS OF USE THEREOF

CROSS REFERENCE TO RELATED APPLICATION

This application claims the benefit or priority to U.S. Provisional Application No. 63/649,141, filed May 17, 2024, entitled "COMPUTER-BASED SYSTEMS CONFIGURED FOR NETWORK CHARACTERIZATION AND MANAGEMENT BASED ON RISK SCORE ANALYSIS AND METHODS OF USE THEREOF", the specification and drawings of which are incorporated herein by reference.

FIELD OF TECHNOLOGY

The present disclosure generally relates to computer network management, and more particularly to computer network characterization and management based on risk score analysis and methods of use thereof.

BACKGROUND OF TECHNOLOGY

Typically, network security may be viewed as the process of safeguarding the underlying networking infrastructure from unauthorized access, misuse, and/or theft. Typically, network security may involve creating a secure environment for devices, applications, users, and/or data to operate safely. In some embodiments, some aspects of network security may include the use of firewalls, intrusion prevention systems (IPS), workload security, network segmentation and/or virtual private networks (VPN).

Firewalls may be network security devices that monitor incoming and outgoing traffic, deciding whether to allow and/or block specific data based on predefined security rules.

IPS may be configured to actively scan network traffic to block attacks. By correlating global threat intelligence, secure IPS appliances may not only prevent malicious activity but may also track suspect files and malware across the network to prevent further spread.

Workload security may protect workloads moving across different cloud and hybrid environments. Workload security ensures security without compromising business agility.

Software-defined network segmentation classifies network traffic based on endpoint identity (not just IP addresses). Access rights may be assigned by role, location, and other factors, ensuring the right level of access for authorized users and the containment of suspicious devices.

VPNs may encrypt connections from endpoints to networks, often over the internet, enhancing privacy and security.

SUMMARY OF DESCRIBED SUBJECT MATTER

In some aspects, the techniques described herein relate to a computer-implemented method including: determining, by a computing device, a plurality of risk scores of a computer network at a first time, the determining including: scanning, by the computing device, a plurality of hosts in the computer network to obtain risk information of each instance of vulnerability associated with each host during a predetermined time period, where the risk information includes a common vulnerability scoring system (CVSS) score, an exploitability measurement and a measurement parameter of identified link to one or more bad actors; calculating, by the computing device, a vulnerability risk score (VRS) for each instance of the vulnerability based on the associated risk information, where the VRS has a linear relationship with the associated CVSS score, the associated exploitability measurement and the associated measurement parameter of identified link to one or more bad actors; determining, by the computing device, a number of vulnerabilities associated with each host of the plurality of hosts in the computer network during the predetermined time period; obtaining, by the computing device, a criticality score of each host of the plurality of hosts in the computer network; obtaining, by the computing device, for each host, a representative VRS based at least in part on the VRS for each instance of vulnerability associated with the host; calculating, by the computing device, a host risk score (HRS) for each host of the plurality of hosts in the computer network based on the representative VRS, the number of vulnerabilities and the criticality score of the host, where the HRS of each host has a linear relationship with the representative VRS, the number of vulnerabilities and the criticality score; calculating, by the computing device, a network risk score (NRS) for the computer network based on the HRS of each host of the plurality of hosts in the computer network; and facilitating, by the computing device, at least one security action based on the HRS for each host and the NRS; repeating, by the computing device, the determining the risk scores at a second time; and displaying, by the computing device, the HRS and the NRS over the first and second time in a chart.

In some aspects, the techniques described herein relate to a method, where each of the CVSS score, the exploitability measurement and the measurement parameter of identified link to one or more bad actors in the linear relationship with the associated VRS carries a weight.

In some aspects, the techniques described herein relate to a method, where a value of either the CVSS score, the exploitability measurement or the measurement parameter of identified link to one or more bad actors is different between the first and second time.

In some aspects, the techniques described herein relate to a method, where each of the representative VRS, the number of vulnerabilities and the criticality score of the host in the linear relationship with the associated HRS carries a weight.

In some aspects, the techniques described herein relate to a method, where a value of either the representative VRS, the number of vulnerabilities or the criticality score of the host is different between the first and second time.

In some aspects, the techniques described herein relate to a method, the representative VRS has a highest value among the VRSs of the host.

In some aspects, the techniques described herein relate to a method, further including determining, by the computing device, a maximum HRS and a mean HRS in the plurality of hosts and using the maximum HRS and the mean HRS to calculate the NRS.

In some aspects, the techniques described herein relate to a method, where the NRS has a linear relationship with the maximum HRS and the mean HRS, each of the maximum HRS and the mean HRS carrying a weight.

In some aspects, the techniques described herein relate to a method, where a value of either the maximum HRS or the mean HRS is different between the first and second time.

In some aspects, the techniques described herein relate to a method, further including storing, by the computing device, the VRS, HRS and NRS in a database.

In some aspects, the techniques described herein relate to a method, further including obtaining, by the computing device, network traffic information at each host of the plurality of hosts in the computer network at the first and second time and display the network traffic information along with the HRS and NRS in the chart.

In some aspects, the techniques described herein relate to a method, further including displaying, by the computing device, a topology of network with the HRS at the first time assigned to each host in the computer network.

In some aspects, the techniques described herein relate to a computer-implemented method including: determining, by a computing device, a plurality of risk scores of a computer network at a first time, the determining including: scanning, by the computing device, a plurality of hosts in the computer network to obtain risk information of each instance of vulnerability occurred to each host during a predetermined time period, where the risk information includes a common vulnerability scoring system (CVSS) score, an exploitability measurement and a measurement parameter of identified link to one or more bad actors; calculating, by the computing device, a vulnerability risk score (VRS) for each instance of the vulnerability based on the associated risk information, where the VRS has a linear relationship with the associated CVSS score, the associated exploitability measurement and the associated measurement parameter of identified link to one or more bad actors; determining, by the computing device, a number of vulnerabilities associated with each host of the plurality of hosts in the computer network during the predetermined time period; obtaining, by the computing device, a criticality score of each host of the plurality of hosts in the computer network; obtaining, by the computing device, for each host, a representative VRS based at least in part on the VRS for each instance of vulnerability associated with the host, the representative VRS having a highest value among the VRSs of the host; calculating, by the computing device, a host risk score (HRS) for each host of the plurality of hosts in the computer network based on the representative VRS, the number of vulnerabilities and the criticality score of the host, where the HRS of each host has a linear relationship with the representative VRS, the number of vulnerabilities and the criticality score; determining, by the computing device, a maximum HRS and a mean HRS in the plurality of hosts; and calculating, by the computing device, a network risk score (NRS) for the computer network based on the maximum HRS and the mean HRS; altering, by the computing device, at least one network security topology based on the HRS for each host and the NRS; repeating, by the computing device, the determining the risk scores at a second time; and displaying, by the computing device, the HRS and the NRS over the first and second time in a chart.

In some aspects, the techniques described herein relate to a method, where each of the CVSS score, the exploitability measurement and the measurement parameter of identified link to one or more bad actors in the linear relationship with the associated VRS carries a weight.

In some aspects, the techniques described herein relate to a method, where the value of either the CVSS score, the exploitability measurement or the measurement parameter of identified link to one or more bad actors is different between the first and second time.

In some aspects, the techniques described herein relate to a method, where each of the representative VRS, the number of vulnerabilities and the criticality score of the host in the linear relationship with the associated HRS carries a weight.

In some aspects, the techniques described herein relate to a method, where the weight of either the representative VRS, the number of vulnerabilities or the criticality score of the host is different between the first and second time.

In some aspects, the techniques described herein relate to a method, where the NRS has linear relationship with the maximum HRS and the mean HRS, each carrying a weight.

In some aspects, the techniques described herein relate to a method, where the value of either the maximum HRS or the mean HRS is different between the first and second time.

In some aspects, the techniques described herein relate to a method, further including obtaining, by the computing device, network traffic information at each host of the plurality of hosts in the computer network at the first and second time and display the network traffic information along with the HRS and NRS in the chart.

In some aspects, the techniques described herein relate to a system, including: one or more processors; and a memory in communication with the one or more processors and storing instructions that, when executed by the one or more processors, cause the one or more processors to: determine a plurality of risk scores of a computer network at a first time, the determining including: scanning a plurality of hosts in the computer network to obtain risk information of each instance of vulnerability associated with each host during a predetermined time period, where the risk information includes a common vulnerability scoring system (CVSS) score, an exploitability measurement and a measurement parameter of identified link to one or more bad actors; calculating a vulnerability risk score (VRS) for each instance of the vulnerability based on the associated risk information, where the VRS has a linear relationship with the associated CVSS score, the associated exploitability measurement and the associated measurement parameter of identified link to one or more bad actors; determining a number of vulnerabilities associated with each host of the plurality of hosts in the computer network during the predetermined time period; obtaining a criticality score of each host of the plurality of hosts in the computer network; obtaining, for each host, a representative VRS based at least in part on the VRS for each instance of vulnerability associated with the host; calculating a host risk score (HRS) for each host of the plurality of hosts in the computer network based on the representative VRS, the number of vulnerabilities and the criticality score of the host, where the HRS of each host has a linear relationship with the representative VRS, the number of vulnerabilities and the criticality score; calculating a network risk score (NRS) for the computer network based on the HRS of each host of the plurality of hosts in the computer network; and facilitating at least one security action on the computer network based on the HRS for each host and the NRS; repeat the determining the risk scores at a second time; and display the HRS and the NRS over the first and second time in a chart.

In some aspects, the techniques described herein relate to a system, where each of the CVSS score, the exploitability measurement and the measurement parameter of identified link to one or more bad actors in the linear relationship with the associated VRS carries a weight.

In some aspects, the techniques described herein relate to a system, where a value of either the CVSS score, the exploitability measurement or the measurement parameter of identified link to one or more bad actors is different between the first and second time.

In some aspects, the techniques described herein relate to a system, where each of the representative VRS, the number of vulnerabilities and the criticality score of the host in the linear relationship with the associated HRS carries a weight.

In some aspects, the techniques described herein relate to a system, where a value of either the representative VRS, the number of vulnerabilities or the criticality score of the host is different between the first and second time.

In some aspects, the techniques described herein relate to a system, where the representative VRS has a highest value among the VRSs of the host.

In some aspects, the techniques described herein relate to a system, where the instructions, when executed by the one or more processors further cause the one or more processors to determine a maximum HRS and a mean HRS in the plurality of hosts and use the maximum HRS and the mean HRS to calculate the NRS.

In some aspects, the techniques described herein relate to a system, where the instructions, when executed by the one or more processors further cause the one or more processors to obtain network traffic information at each host of the plurality of hosts in the computer network at the first and second time and display the network traffic information along with the HRS and NRS in the chart.

In some aspects, the techniques described herein relate to a system, where the instructions when executed by the one or more processors, further cause the one or more processors to store the VRS, HRS and NRS in a database.

In some aspects, the techniques described herein relate to a system, including: one or more processors; and a memory in communication with the one or more processors and storing instructions that, when executed by the one or more processors, cause the one or more processors to: determine a plurality of risk scores of a computer network at a first time, the determining including: scanning a plurality of hosts in the computer network to obtain risk information of each instance of vulnerability occurred to each host during a predetermined time period, where the risk information includes a common vulnerability scoring system (CVSS) score, an exploitability measurement and a measurement parameter of identified link to one or more bad actors; calculating a vulnerability risk score (VRS) for each instance of the vulnerability based on the associated risk information, where the VRS has a linear relationship with the associated CVSS score, the associated exploitability measurement and the associated measurement parameter of identified link to one or more bad actors; determining a number of vulnerabilities associated with each host of the plurality of hosts in the computer network during the predetermined time period; obtaining a criticality score of each host of the plurality of hosts in the computer network; obtaining for each host, a representative VRS based at least in part on the VRS for each instance of vulnerability associated with the host, the representative VRS having a highest value among the VRSs of the host; calculating a host risk score (HRS) for each host of the plurality of hosts in the computer network based on the representative VRS, the number of vulnerabilities and the criticality score of the host, where the HRS of each host has a linear relationship with the representative VRS, the number of vulnerabilities and the criticality score; determining a maximum HRS and a mean HRS in the plurality of hosts; and calculating a network risk score (NRS) for the computer network based on the maximum HRS and the mean HRS; altering at least one network security topology based on the HRS for each host and the NRS; repeat the determining the risk scores at a second time; and display the HRS and the NRS over the first and second time in a chart.

BRIEF DESCRIPTION OF THE DRAWINGS

Various embodiments of the present disclosure can be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 shows a dashboard displaying vulnerability risk score and descriptive data from publicly available data sources.

FIG. 6 shows a dashboard with a table displaying other host-related information, such as host type, host type confidence, host risk score and host criticality score, that the presently disclosed network characterization and management system may utilize to prioritize patch management and/or proactively improve cyber defense posture.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The present disclosure describes various aspects of various embodiments of network characterization and management systems based on risk score analysis.

Figure 1:
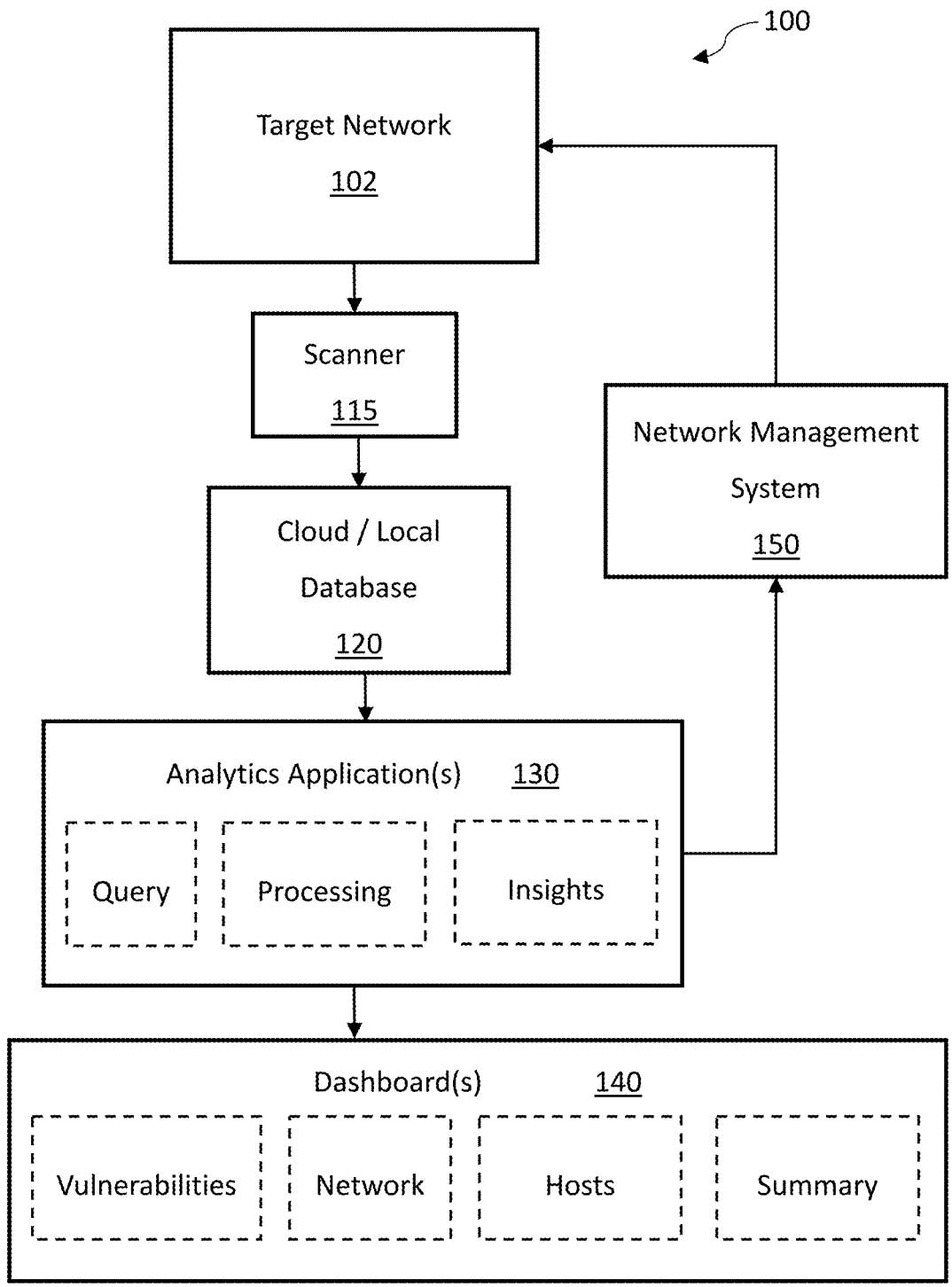
FIG. 1 is a block diagram of an exemplary network characterization and management system for securing a computer network in accordance with one or more embodiments of the present disclosure.

FIG. 1 is a block diagram of an exemplary network characterization and management system 100 for securing a computer network in accordance with one or more embodiments of the present disclosure. The network characterization and management system 100 includes at least one scanner 115, at least one cloud and/or local database 120, at least one analytics application 130, at least one dashboard 140 and a network management system 150 for securing a target network 102.

In some embodiments, the scanner 115 runs on the target network 102 from a scanner host to explore and gather information about devices on the target network 102. For example, the scanner 115 scans the target network 102 and identifies media access control (MAC) addresses associated with all the devices connected therein. The scanner 115 can also identify active Internet protocol (IP) addresses within a given range or subnet and determine availability of hosts or devices on the target network 102. Scans may include, but are not limited to, host discovery and vulnerability scans.

The term "host," as used herein, refers generally to any device on the network and may include but is not limited to workstations, routers, servers, printers, or cameras. If a device interacts with other network components and/or performs at least one network operation, the device qualifies as a host.

In some embodiments, the scan results may be pushed to database 120 for retrieval. The database 120 may be cloud-based, local to the scanner 115, or both. By pushing the scan results to the database 120, the network characterization and management system 100 can assess and monitor network vulnerabilities, maintain an asset inventory, detect changes in the target network 102, and centralize reporting and analysis.

For vulnerability assessment and monitoring, pushing scan results to the database 120 allows organizations to maintain a historical record of security assessments. This enables organizations to track changes over time, compare results, and ensure compliance with security policies.

For asset inventory and tracking, network scans reveal information about devices, services, and software running on the target network 102. Pushing this data to the database 120 allows organizations to create an inventory of network assets. Pushing data to the database 120 helps answer questions like: "What devices are connected?", "Which software versions are in use?", and "Are there unauthorized or unpatched systems?".

Regular network scans enables change detection for the network environment. By storing scan results in the database 120, organizations can track modifications such as: new devices added; software installations or updates; and configuration changes. Such regular network scans aid in incident response and forensics.

For centralized reporting and analysis, the database 120 provides a centralized repository for scan results. Security teams can generate reports, visualize trends, and analyze patterns. Such centralized reporting and analysis facilitate decision-making, risk assessment, and resource allocation.

In general, pushing scan results to the database 120 may be like having a well-organized library of network insights.

In some embodiments, the analytics applications 130 query the database 120 to retrieve scan results, process scan results, and present insights derived from data to end users. The analytics applications 130 collect, process and analyze network data to improve various aspects of the network. The present disclosure describes a system and method to automate analytics applications, thus eliminating the need for manual troubleshooting and complex tasks performed by information technology (IT) staff members.

In some embodiments, the analytics applications 130 extract intelligence from data collected from diverse sources: network devices (such as switches, routers, and wireless access points), servers (including syslog, DHCP, AAA, and configuration databases), and traffic-flow details (such as wireless congestion, data speeds, and latency). The extracted intelligence may be displayed in the analytics applications 130 and provide insights of the target network 102 that include, but are not limited to, identifying performance bottlenecks, evaluating the health of network devices, recommending adjustments to enhance performance, analyzing traffic to and from endpoints to build profiles, detecting anomalies (even in encrypted traffic) that may indicate compromised endpoints, and/or any combination thereof.

As shown in FIG. 1, the insights generated by analytics application 130 may be provided to both the dashboards 140 and the network management system 150. In some embodiments, the dashboards 140 display information about vulnerabilities present on the target network 102, hosts on the network, and an overall summary of the network.

In some embodiments, the network management system 150 may be an application or set of applications that enables network administrators to manage various components within the target network. The network management system 150 provides a unified platform for configuring, monitoring and optimizing network performance. In one or more embodiments, the network management system 150 allows administrators to set up and adjust network devices (such as switches, routers, and access points) according to specific requirements. The network management system 150 collects real-time data from network elements and endpoint devices (e.g., mobile phones, laptops). This data helps proactively identify performance issues, monitor security, and segment the network. The network management system 150 improves information technology and network monitoring (including debugging, security, etc.) by accelerating problem resolution by providing insights into network health and performance. The network management system 150 assists in monitoring security events, detecting anomalies, and ensuring compliance with security policies.

To communicate the harm that specific vulnerabilities could pose if exploited, organizations use scores calculated using the Common Vulnerability Scoring System (CVSS) framework. While CVSS scores are one factor that may inform risk assessments, they do not contextualize the risk a specific vulnerability poses to the security of the overall network.

For instance, a critical vulnerability on a device that communicates with only one other isolated workstation on a network poses relatively low risk. If exploited, an intruder gaining access to the network could only reach two workstations out of an entire network.

The risk score methodology proposed herein contextualizes risk based on various factors. There may be scores, methodologies, or formulas at four different levels within the proposed framework. The first level may be contextualized vulnerability risk scores, which may be a linear combination of components and weights relevant to contextualizing risk posed by specific vulnerabilities. In some other embodiments, the combination of components and the weights may be non-linear, logarithmic, exponential, or other form of combination or any combination thereof.

The contextualized risk posed by a vulnerability to a network, or a host contained therein may be estimated by a vulnerability risk score (VRS). In embodiments, the VRS may be a combination of components and/or weights relevant for contextualizing risk from a vulnerability, such as a linear combination, non-linear combination, logarithmic combination, exponential combination, or other form of combination or any combination thereof.

Components include, but are not limited to, CVSS scores, exploitability (e.g., whether the vulnerability is known to be exploitable), and identified links to one or more bad actors (e.g., if bad actors are known to exploit this specific vulnerability or those like it). The CVSS may be a method used to assess the severity of vulnerabilities and provides a qualitative measure of severity, but CVSS scores are not a direct measure of risk. The CVSS may include three metric groups: Base, Temporal, and Environmental. The Base metrics, which represent the innate characteristics of each vulnerability, include a numerical score (ranging from 0 to 10) and a vector string.

CVSS scores are industry-standard measures between zero and ten that quantify the severity of a given vulnerability. CVSS scores may also account for whether a vulnerability is exploitable or not. Severe vulnerabilities are likely to be exploitable, but it's not a guarantee.

TABLE 1 presents exemplary qualitative severity ratings for both CVSS v2.0 and v3.x. Although not shown in TABLE 1, the present disclosure may also be applied to CVSS v4 and beyond.

TABLE 1

| Severity | Score Range (v2.0) | Score Range (v3.x) |
|---|---|---|
| None | | 0.0 |
| Low | 0.0-3.9 | 0.1-3.9 |
| Medium | 4.0-6.9 | 4.0-6.9 |
| High | 7.0-10.0 | 7.0-8.9 |
| Critical | | 9.0-10.0 |

The components and weights used to derive VRS may be scaled to constrain the range of VRS. For example, if each component is scaled from 0 to 100 and the weights sum to 1, VRS falls between 0 and 100 by construction.

In some embodiments, the VRS for a given vulnerability is the same for all hosts with the detected vulnerability. In other words, the VRS may be device agnostic.

The weights used to derive VRS may be empirically determined, tuned in an automated fashion, or set by a user of the presently disclosed network characterization and management system 150.

In some implementations, automatically tuning weights may include a target variable, which may include but is not limited to:

A binary variable indicating if the vulnerability is known to be exploited on the network of interest; and/or The time between first detection and patch date on a network for a specific vulnerability.

Linear regression is one example of a tuning method given the current formula for VRS; other approaches may be utilized to include one or more interaction terms, higher-order components (e.g., $x^2$ for a given component x), and/or other similarly suitable parameters.

For example, if we have the following components and weights:

Components: [1] CVSS v3 Base Score=9.8 (component=98), [2] Exploitability: Yes (component=100), [3] Identified Link to One or More Bad Actors: Yes (component=100)

Weights (for [1], [2], and [3], respectively): 0.6, 0.25, 0.15

VRS=0.6(98)+0.25(100)+0.15(100)=98.8.

For example, a calculation of how to reach the final score may include base score ranges from zero to ten. In this example, the vulnerability may be known to be exploited and has been identified as being exploited by one or more threat groups of concern. A weight may be assigned to each factor here for each component. The formula then may be just weight times component. Each of the products may be scaled between zero and 100. That results in the final score. For example, if there are 100 devices in a network and the same vulnerabilities detected on five of those devices, the risk score may be the same for that vulnerability on all of those devices, i.e., the risk score may be device agnostic.

Alternatively, the "Exploitability" component, instead of being binarized (0 or 100), may be a continuous value that accounts for factors like the (1) time since the first reported exploit, (2) number of reported exploits in the last N days, and (3) number of reported exploits by relevant bad actors.

The "Identified Link to One or More Bad Actors" component, instead of being binarized (0 or 100), may also be a continuous value that accounts for factors such as (1) the fraction of bad actors on a user-defined watchlist known to exploit the specific vulnerability, (2) the recent activity levels of linked bad actors, and (3) the relative prominence of linked bad actors.

However, the severity of threats from different bad actors may be different, so in some embodiments, a quantitative measure of the degree of risk posed by each specific bad actor may be used to derive the "Identified Link to One or More Bad Actors" component. This value may be continuous or discrete and depend on how threats from bad actors are characterized.

In some embodiments, the link between bad actors and threat groups may be provided by a third-party threat intelligence data provider. In other embodiments, this may be determined by a module within the analytics application 130 that parses one or more intelligence feeds, such as one or more proprietary and/or open source threat intelligence feeds. In some embodiments, the link between bad actors and threat groups may be provided by manual input, such as by an administrator or analyst associated with the network.

In some embodiments where bad actors are known to preside in specific geographic locations and pose risk to specific networks and/or capabilities, the country of origin for those bad actors may also be incorporated into the "Identified Link to One or More Bad Actors" component. This would then increase the relative magnitude of the component. Further, other factors, such as the capability or intent of bad actors, may influence the "Identified Link to One or More Bad Actors" component. For example, a nascent group that has not caused major disruptions would pose less of a risk than advanced persistent threats (APT). As another example, an established APT known to target government infrastructure or successfully breached said networks poses a greater risk to government networks.

In some implementations, the VRS may include, but is not limited to, the above detailed components. Indeed, the VRS may be extensible (e.g., the VRS may incorporate other new and/or independent components). If there are other factors a user wants to include, the formula, in the presently disclosed method may incorporate those. Each new component must be assigned a weight. The weights used to derive VRS may be empirically determined, tuned in an automated fashion, or set by a user of the presently disclosed network characterization and management system 150.

The second level of risk in the proposed risk methodology consists of a host risk score (HRS). HRS may be calculated by aggregating vulnerability risk scores for all vulnerabilities detected on the host, layering on additional contextual information as available. The contextualized risk posed by a vulnerability to a host contained therein may be estimated by a vulnerability risk score (VRS). In embodiments, the VRS may be a combination of components and/or weights relevant for contextualizing risk from a vulnerability, such as a linear combination, non-linear combination, logarithmic combination, exponential combination, or other form of combination or any combination thereof.

Components of HRS include, but at not limited to:

Maximum Vulnerability Risk Score (taken across all vulnerabilities detected on the host).

Host Criticality (as determined by the user or via Automated Key Terrain Identification, which quantifies host criticality by deriving host criticality scores (HCS) to hosts).

Number of Vulnerabilities Detected on host (relative to the total number of vulnerabilities detected on network).

The components and weights used to calculate HRS may be scaled to ensure the final score falls in a defined range by construction (same as the VRS).

The weights used to calculate HRS may be empirically determined, tuned in an automated fashion, or set by the user of the presently disclosed network characterization and management system (same as VRS).

In some implementations, automatically tuning weights requires a target variable, which may include but is not limited to:

Indicator variable highlighting if the host was known to be exploited on the network of interest Categorical variable assigned by risk analyst/patch manager that quantifies risk Linear regression is one example of a tuning method given the current formula for HRS; other approaches may be viable if the formula is extended to include interaction terms, higher-order components (e.g., $x^2$ for a given component x).

For example,

Components (scaled to each lie between 0 and 100):

$$\text{Maximum VRS}=\text{Max}([98.8, 53.4, 23.1, 57.2])=98.8. \quad [1]$$

$$\text{Host Criticality (set by user)} \rightarrow 90 \text{ (arbitrarily defined for this example).} \quad [2]$$

$$\text{Number of Vulnerabilities Detected on the Host}=4/8 \text{ (total detected on network)}=0.5 \rightarrow 50 \text{ (after scaling).} \quad [3]$$

Weights (for [1], [2], and [3], respectively): 0.8, 0.15, 0.05.

$$\text{HRS}=0.8(98.8)+0.15(90)+0.05(50)=95.0.$$

In some implementations, instead of taking maximum VRS, other aggregation method(s) may be used to account for the distribution of VRS for all vulnerabilities detected on the host.

In some implementations, the "Host Criticality" component may be binarized (e.g., critical or not critical) instead of being a continuous value. This component may also be emergent from the solution for the automated key terrain identification.

In some implementations, the "Number of Vulnerabilities Detected on the Host" component, instead of a simple fraction, may account for other factors including (1) severity (as quantified by CVSS score), (2) exploitability, and (3) patchability.

In some implementations, the HRS calculation may incorporate other new and/or independent components if other contextual information about hosts is available.

The third level of risk in the proposed risk score methodology is network risk score (NRS). NRS represents aggregated host risk scores for all hosts identified on a network to get a single quantitative measure of risk for the entire network. Aspects of embodiments of NRS may be applied to smaller collections of hosts uniquely grouped (e.g., subnets) as well. The contextualized risk posed by a vulnerability to a network contained therein may be estimated by a vulnerability risk score (VRS). In embodiments, the VRS may be a combination of components and/or weights relevant for contextualizing risk from a vulnerability, such as a linear combination, non-linear combination, logarithmic combination, exponential combination, or other form of combination or any combination thereof.

Components used to calculate NRS include but are not limited to:

Maximum Host Risk Score (taken across all hosts on the network).

Mean Host Risk Score (taken across all hosts on the network).

The components and weights used to calculate NRS may be scaled to ensure the final score falls in a defined range by construction (same as VRS, HRS).

Weights may be empirically determined, tuned in an automated fashion, or set by the user of the presently disclosed network characterization and management system (same as VRS and HRS).

In some implementations, automatically tuning weights may include a target variable, which may include but is not limited to:

Indicator variable highlighting if network known to be exploited

Linear regression is one example of a tuning method given the current formula; other approaches would be viable if the formula is extended to include interaction terms, higher-order components (e.g., $x^2$ for a given component x).

For example,

Components:

[1] Maximum HRS: 92.0

[2] Mean HRS: 73.2

Weights (for [1] and [2], respectively): 0.8, 0.2

$$\text{NRS}=0.8(92.0)+0.2(73.2)=88.2.$$

In some implementations, instead of taking maximum and mean HRS, other aggregation method(s) may be used to account for the distribution of the HRS for all hosts on a network. For example, if the distribution of HRS is discretized, component values may be fractions of the distribution (e.g., area under the curve) in each discrete HRS range.

In some implementations, the NRS calculation may incorporate other new and/or independent components if contextual information about the network is available.

Risk scores (VRS, HRS and NRS) may be used to quantify degrees of risk over time and provide quantitative measures of risk that may be used to prioritize remediation strategies.

In some implementations, patch managers can sort detected vulnerabilities by VRS and prioritize patching vulnerabilities with high VRS. This may be an improvement over patching based on CVSS scores that do not contextualize the degree of risk a vulnerability poses to a specific network.

In some implementations, cyber analysts protecting a network can sort hosts detected on the network by HRS and overlay complementary information to perform a proper risk assessment. For example, host criticality may quantify how essential the operations a given host performs in reference to the overall operation of the network (or other business problem). When paired with HRS, analysts may rapidly identify what critical infrastructure is most at risk for exploitation. Further, overlaying HRS with network traffic data (e.g., PCAP files which is a packet capture created by Wireshark, a free network data analysis program. It contains network packet data that Wireshark intercepted and logged while monitoring a network.) would provide amplifying information for determining which hosts to patch next to improve overall defensive posture, as that would provide viable paths bad actors could take through the network given an entry point.

In some implementations, organizations managing multiple networks can compare NRS across networks to assess relative security of each network and manage remediation efforts across multiple networks. Consistent scaling and/or bounding the components that underlie each risk score enables direct comparison of relative magnitudes of scores.

The security of a network is only as strong as its weakest link. Consequently, risk score calculations may be based on around maximum scores. Consider a router that directs traffic to every workstation on a network—the router plays a more critical role in network operations than a printer tucked away in a corner, which only one computer can print to. Quantitative risk assessment involves calculating risk scores and taking into account such factors in the form of host criticality.

The present disclosure aggregates the host risk scores calculated for all hosts on a network to calculate network risk score, adhering to the principle that a network may be only as strong as its weakest link. The components can be broken down to:

Maximum Host Risk: Suppose your network consists of 100 hosts, and the highest host risk score is 92. This component contributes 92 to the overall risk assessment.

Average Host Risk: Now consider the remaining 99 hosts. If their risk scores are all less than 10, the situation differs from having an ISP with a score of 92 and the rest uniformly distributed between 0 and 100. The average host risk captures the entire trend of the network.

The present disclosure employs dashboards to present views of risk at various levels (vulnerability, host, network). Each vulnerability has a unique identifier, allowing users to review information about individual vulnerabilities. Additionally, the present disclosure offers a host dashboard with unique identifiers. Users can view the host risk score and the contributing factors used to compute it. This facilitates quick assessments—for instance, identifying devices at higher risk and determining reasons to inform remediation efforts.

The presently disclosed solution includes implicitly learning contextual information from vulnerability scans. By analyzing scan data, for example, users can examine the services running on each host and infer host criticality. For example, a server running SQL Server may house a critical database essential for network operations. While the user may explicitly highlight a specific server's importance, implicit insights emerge from the services associated with each host.

According to present disclosure, one approach to augmenting the insights emergent from the risk score methodology may be leveraging network sensors that detect traffic. For instance, if a router handles 90% of network traffic over a seven-day period, this router may serve as a true signal of day-to-day network operations and is important to factor into a risk assessment.

Alternatively, users can designate critical hosts manually. Imagine a sensitive network with an authentication server for a highly critical application but that server is not scanned regularly. If that authentication server becomes compromised, the authentication server could break authentication, granting unauthorized access to sensitive resources. In this scenario, the server hosting the authentication functionality automatically becomes critical, yet the information used to implicitly determine host criticality is not available.

The risk score methodology may also be viewed as a component of a broader solution that generates a network map to allow the user to contextualize the importance of various nodes or hosts within a network.

One or more technical challenges associated with the proposed risk score methodology is comparing scores across different tiers. Without standardized thresholds, gauging the relative significance of each score becomes unworkable. Establishing consistent benchmarks enables navigating this complexity.

For example: in a certain locale, a high threshold for a network might be anything above 90, while a low threshold could be anything below 85. However, the numbers can appear equally high because the vulnerability threshold may range from 75 to 100 or even lower. For instance, a vulnerability score of 50 to 100 indicates a very high risk for a learner's network. Additionally, the difference between scores like 86 and 88 may be quite significant.

The present disclosure pertains to network risk assessment. The dashboard views may provide examples of insights in the network, host, and vulnerability view. Users can filter by specific network IDs and access summary statistics. Beyond the risk score, the dashboard(s) may include additional contextual information embedded in the dashboards. For example, in the host view:

Host Count: number of hosts present on the network.

Services Running: services these hosts run.

Host Types: numbers of servers, routers, or workstations.

This holistic approach combines theoretical underpinnings with user-friendly interface to achieve comprehensive protection for the network.

FIG. 2 shows a dashboard displaying vulnerability risk score and descriptive data from publicly available data sources (e.g., NIST, NVD, CISA's Known Exploited Vulnerabilities Catalog) for a specific vulnerability, as identified by the Common Vulnerabilities and Exposures (CVE) system. The infographic also displays factors used to determine VRS. Users of the presently disclosed network characterization and management system may be presented with recommended actions based on the reported VRS.

Similar to VRS, HRS may be presented in a dashboard view that displays descriptive information about a given host.

Figure 3:
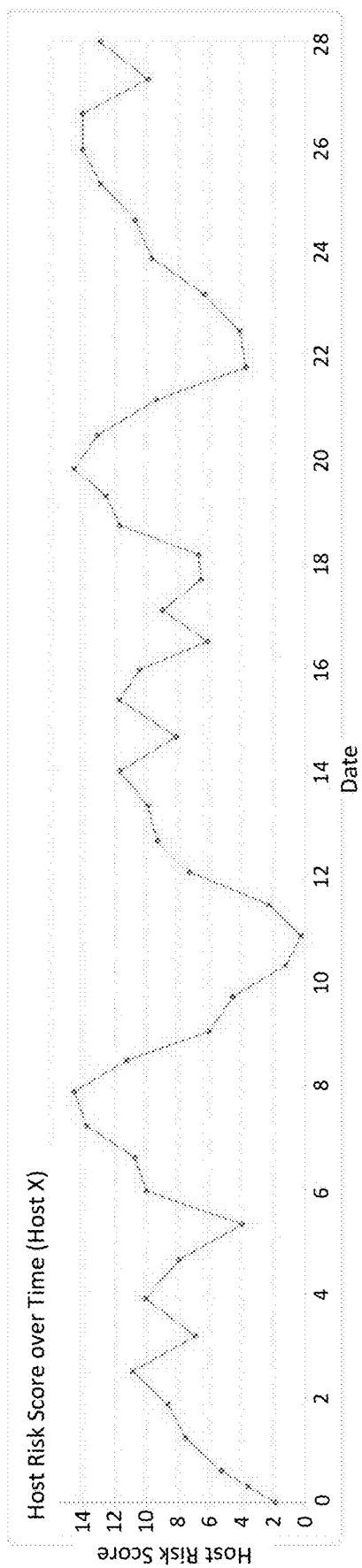
FIG. 3 is a line chart displaying a host risk score over time for a selected host (Host X).

FIG. 3 is a line chart displaying a host risk score over time for a selected host (Host X). Data used to determine HRS may be embedded in the line chart (available by clicking on points) or in another dashboard element. A downward trend of the HRS over time may indicate that a patch applied to the host may be effective in reducing the risk. On the other hand, an upward trend of the HRS over time may indicate that a different remediation measure needs to be applied to the host.

Figure 4:
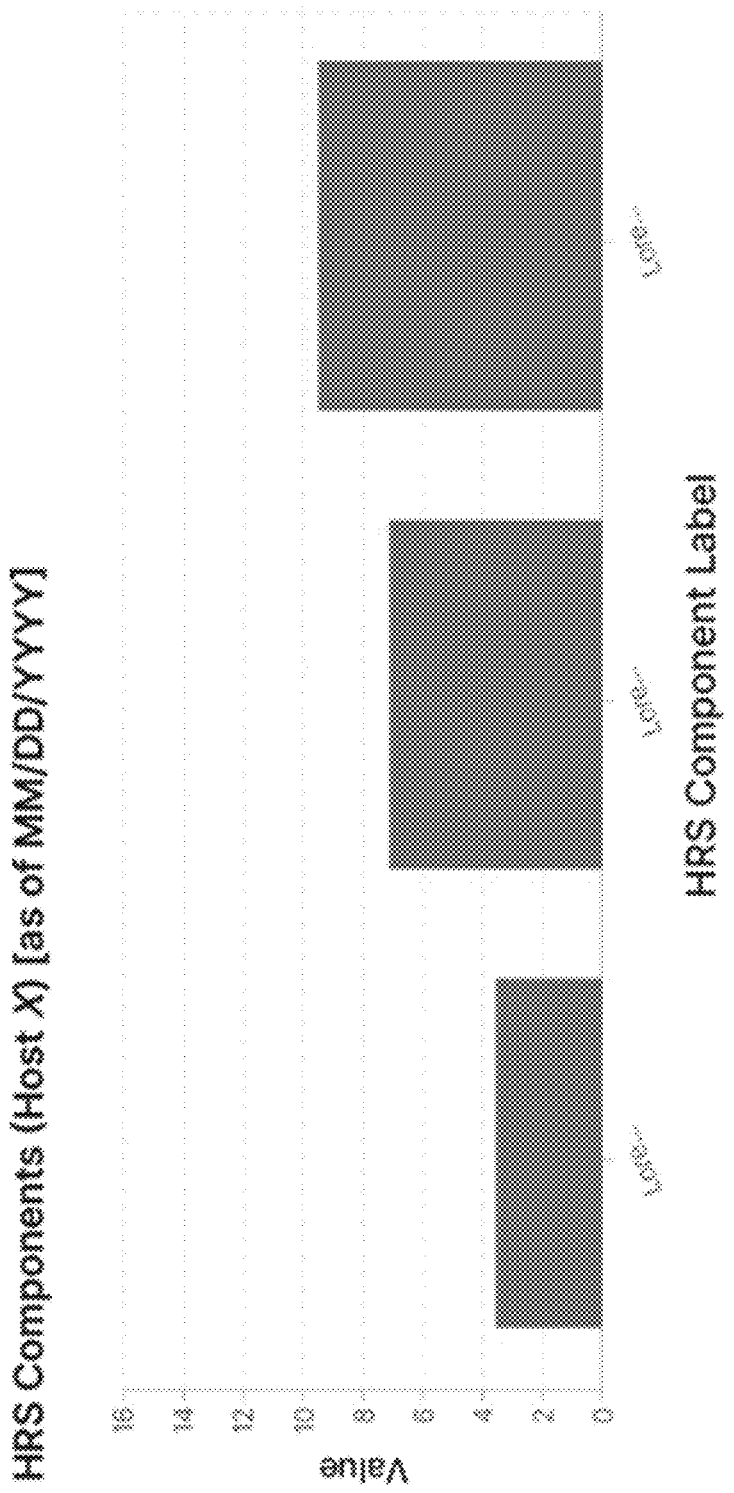
FIG. 4 is a bar chart showing component scores used to calculate HRS to enable deeper analyses.

FIG. 4 is a bar chart showing component scores used to calculate HRS to enable deeper analyses.

Figure 5:
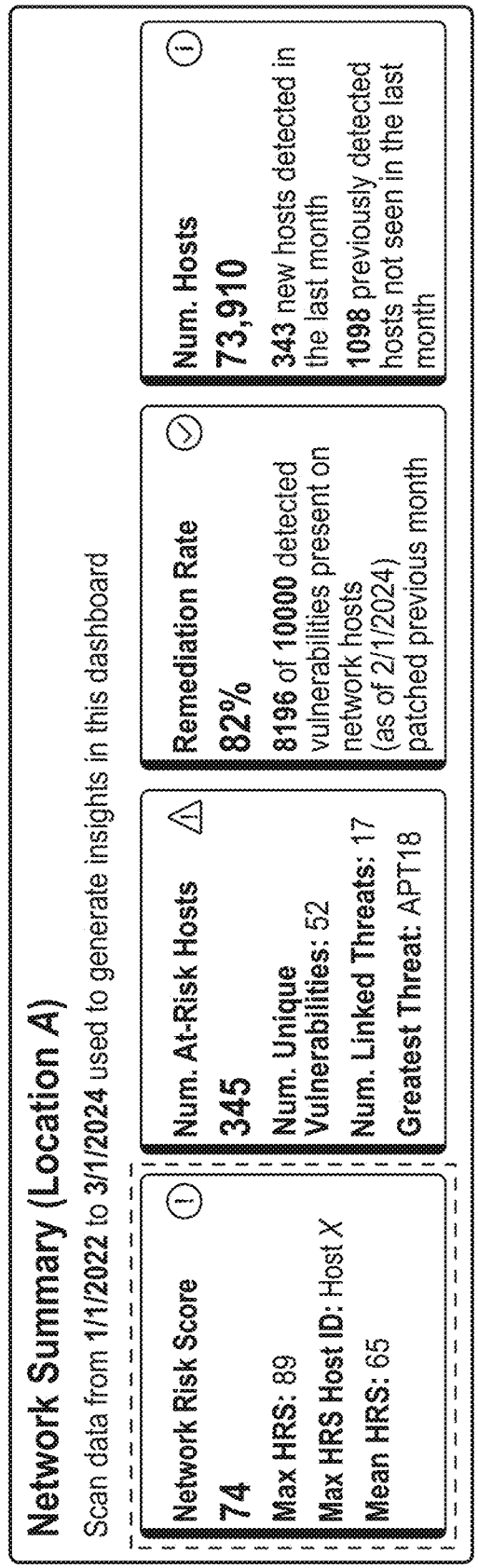
FIG. 5 shows a dashboard displaying network risk score (NRS) and aggregate statistics about identified hosts, detected vulnerabilities, and linked threats for a selected network.

FIG. 5 shows a dashboard displaying network risk score (NRS) and aggregate statistics about identified hosts, detected vulnerabilities, and linked threats for a selected network. Infographic displays factors used to determine the NRS.

FIG. 6 shows a dashboard with a table displaying other host-related information, such as host type, host type confidence, host risk score and host criticality score, that the presently disclosed network characterization and management system may utilize to prioritize patch management and/or proactively improve cyber defense posture.

Figure 7:
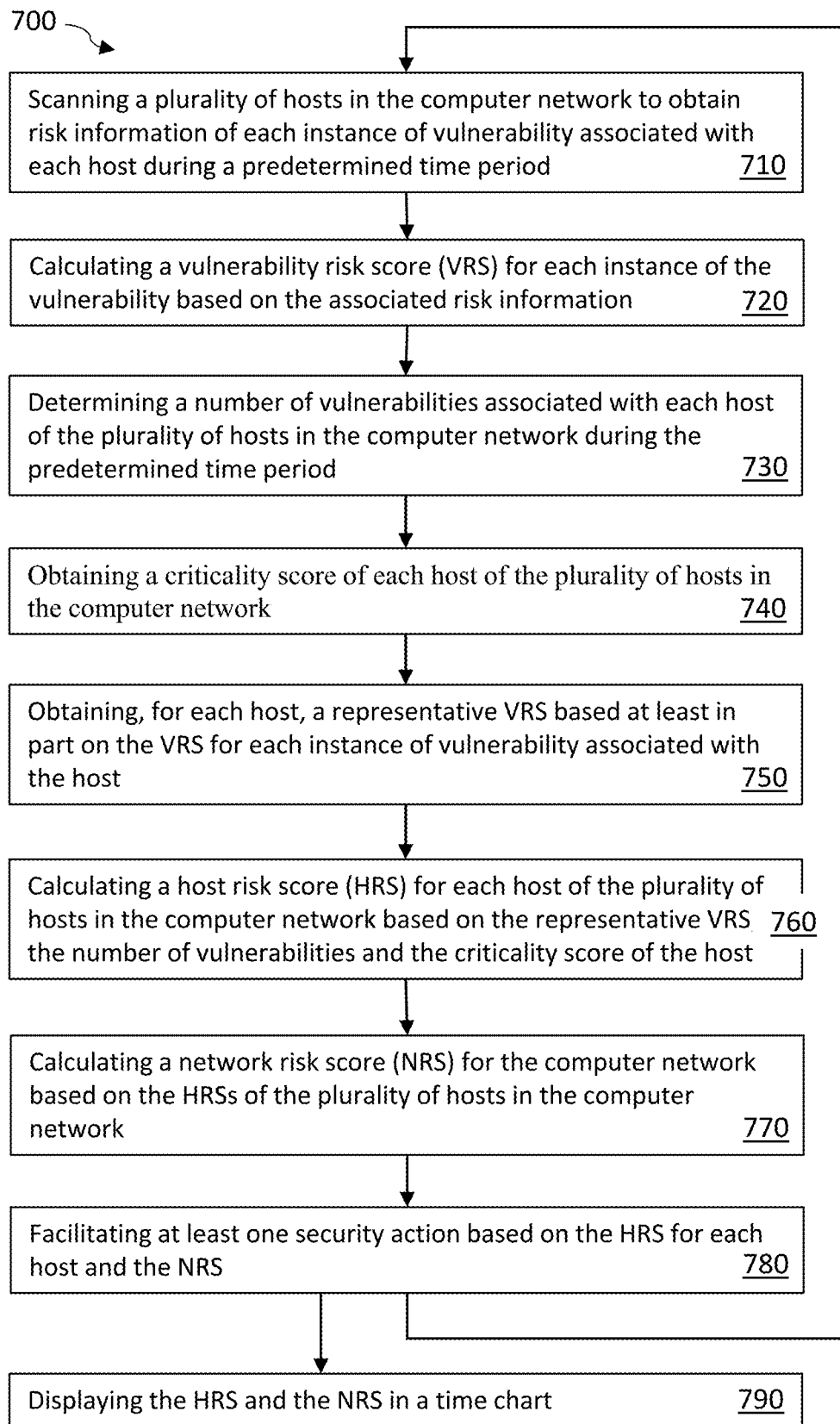
FIG. 7 is a flowchart illustrating an exemplary computer network management process in accordance with one or more embodiments of the present disclosure.

FIG. 7 is a flowchart illustrating an exemplary computer network management process 700 in accordance with one or more embodiments of the present disclosure. The steps shown in FIG. 7 can be performed by any suitable computer-executable code and/or computing system, including system 100 in FIG. 1, and/or variations or combinations of one or more of the same. In one example, each of the steps shown in FIG. 7 can represent an algorithm whose structure includes and/or is represented by multiple sub-steps, examples of which will be provided in greater detail below.

In step 710, a computing device scans a plurality of hosts in a computer network to obtain risk information of each instance of vulnerability associated with each host during a predetermined time period. In some embodiments, the risk information includes a common vulnerability scoring system (CVSS) score, an exploitability measurement and a measurement parameter of identified link to one or more bad actors.

In step 720, the computing device calculates a vulnerability risk score (VRS) for each instance of the vulnerability based on the associated risk information. In some embodiments, the VRS has a linear relationship with the associated CVSS score, the associated exploitability measurement and the associated measurement parameter of identified link to one or more bad actors, each carrying a weight.

In step 730, the computing device determines a number of vulnerabilities associated with each host of the plurality of hosts in the computer network during the predetermined time period.

In step 740, the computing device obtains a criticality score of each host of the plurality of hosts in the computer network.

In step 750, the computing device obtains, for each host, a representative VRS based at least in part on the VRS for each instance of vulnerability associated with the host. In some embodiments, the representative VRS may be the one that has the highest value among the VRSs of the host.

In step 760, the computing device calculates a host risk score (HRS) for each host of the plurality of hosts in the computer network based on the representative VRS, the number of vulnerabilities and the criticality score of the host. In some embodiments, the HRS of a host has a linear relationship with the representative VRS, the number of vulnerabilities and the criticality score of the host, each carrying a weight.

In step 770, the computing device calculates a network risk score (NRS) for the computer network based on the HRSs of the plurality of hosts in the computer network.

In step 780, the computing device facilitates at least one security action based on the HRS for each host and the NRS.

As shown in FIG. 7, the process 700 repeats steps 710 through 780 at a predetermined frequency.

In step 790, the computing device display the HRS and the NRS over in a time chart, so that the network security situation can be observed in real time.

Figure 8:
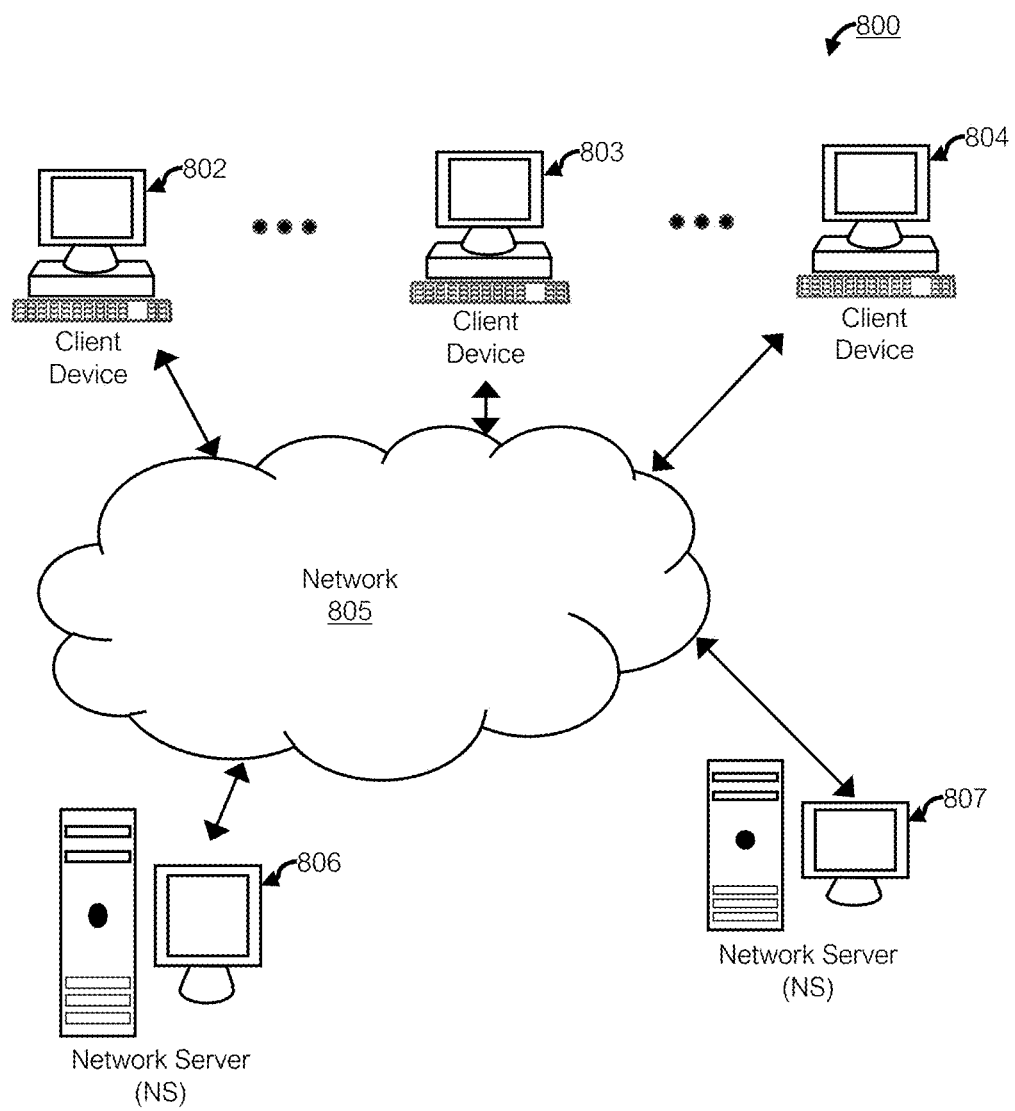
FIG. 8 depicts a block diagram of an exemplary computer-based system and platform in accordance with one or more embodiments of the present disclosure.

FIG. 8 depicts a block diagram of an exemplary computer-based system and platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 800 may be configured to generate a plurality of unique identification codes for the plurality of devices, compare the plurality of unique identification codes, and calculate a similarity score based on the comparison of the plurality of unique identification codes, as detailed herein. In some embodiments, the exemplary computer-based system and platform 800 may be based on a scalable computer and network architecture that incorporates various strategies for assessing the data, caching, searching, and/or database connection pooling. An example of the scalable architecture is an architecture that is capable of operating multiple servers.

In some embodiments, referring to FIG. 8, client device 802, client device 303 through client device 304 (e.g., clients) of the exemplary computer-based system and platform 800 may include virtually any computing device capable of receiving and sending a message over a network (e.g., cloud network), such as network 805, to and from another computing device, such as servers 806 and 807, each other, and the like. In some embodiments, the client devices 802 through 804 may be personal computers, multiprocessor systems, microprocessor-based or programmable consumer electronics, network PCs, and the like. In some embodiments, one or more client devices within client devices 802 through 804 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices 802 through 804 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 802 through 804 may run one or more applications, such as Internet browsers, mobile applications, voice calls, video games, videoconferencing, and email, among others. In some embodiments, one or more client devices within client devices 802 through 804 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 802 through 804 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advanced user, standard user. In some embodiments, one or more client devices within client devices 802 through 804 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 805 may provide network access, data transport and/or other services to any computing device coupled to it. In some embodiments, the exemplary network 805 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 805 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 805 may include and implement, as an alternative or in conjunction with one or more of the above, a WiMAX architecture defined by the WiMAX forum. In some embodiments and, optionally, in combination of any embodiment described above or below, the exemplary network 805 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 805 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 805 may also include mass storage, such as network attached storage (NAS), a storage area network (SAN), a content delivery network (CDN) or other forms of computer or machine-readable media.

In some embodiments, the exemplary server 806 or the exemplary server 807 may be a web server (or a series of servers) running a network operating system, examples of which may include but are not limited to Apache on Linux or Microsoft IIS (Internet Information Services). In some embodiments, the exemplary server 806 or the exemplary server 807 may be used for and/or provide cloud and/or network computing. Although not shown in FIG. 8, in some embodiments, the exemplary server 806 or the exemplary server 807 may have connections to external systems like email, SMS messaging, text messaging, ad content providers, etc. Any of the features of the exemplary server 806 may be also implemented in the exemplary server 807 and vice versa.

In some embodiments, one or more of the exemplary servers 806 and 807 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 801 through 804.

In some embodiments and, optionally, in combination of any embodiment described above or below, for example, one or more exemplary computing client devices 802 through 804, the exemplary server 806, and/or the exemplary server 807 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 9:
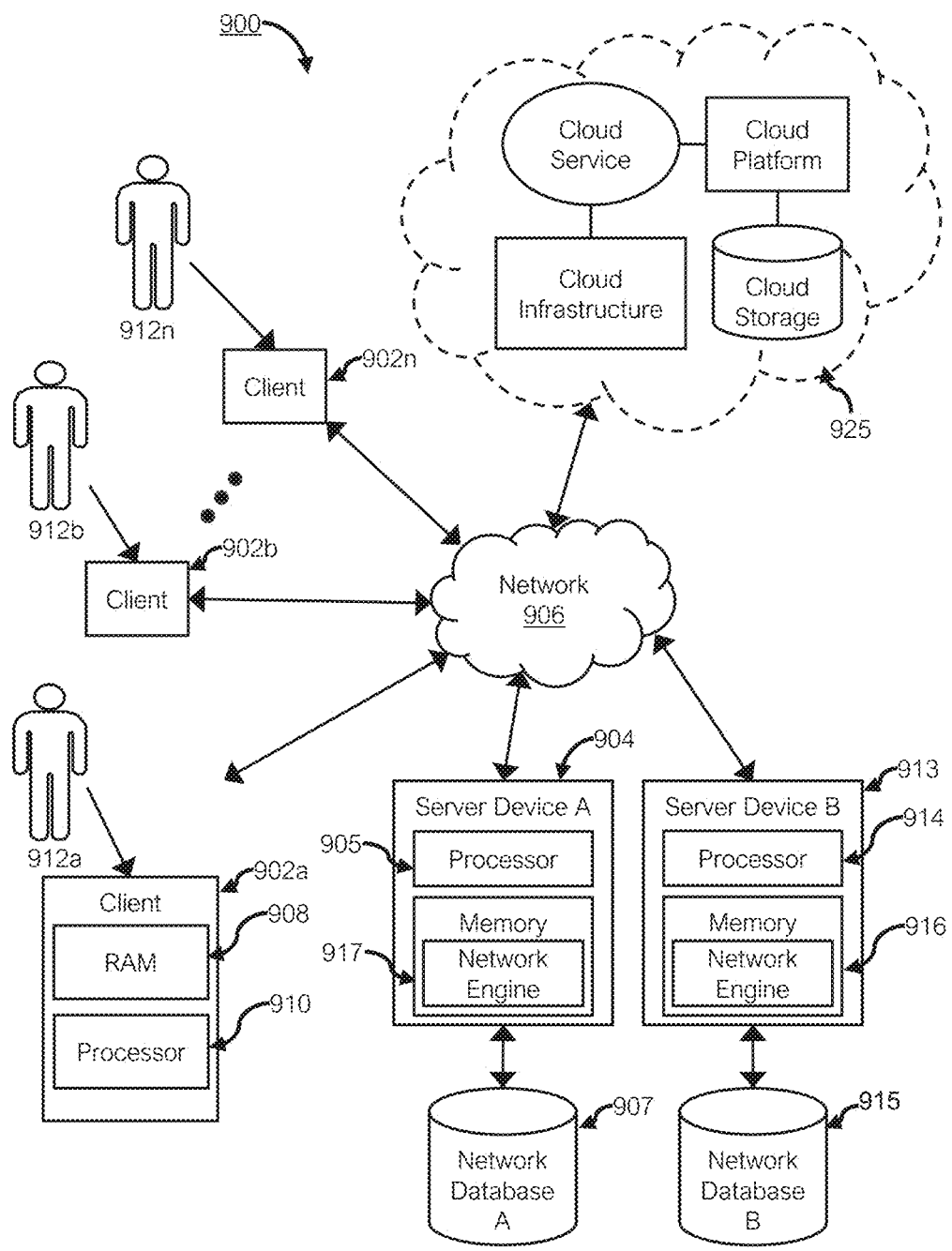
FIG. 9 depicts a block diagram of another exemplary computer-based system and platform 900 in accordance with one or more embodiments of the present disclosure.

FIG. 9 depicts a block diagram of another exemplary computer-based system and platform 900 in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the client device 902*a*, client device 902*b* through client device 902*n* shown each at least includes a computer-readable medium, such as a random-access memory (RAM) 908 coupled to a processor 910 or FLASH memory. In some embodiments, the processor 910 may execute computer-executable program instructions stored in memory 908. In some embodiments, the processor 910 may include a microprocessor, an ASIC, and/or a state machine. In some embodiments, the processor 910 may include, or may be in communication with, media, for example computer-readable media, which stores instructions that, when executed by the processor 910, may cause the processor 910 to perform one or more steps described herein. In some embodiments, examples of computer-readable media may include, but are not limited to, an electronic, optical, magnetic, or other storage or transmission device capable of providing a processor, such as the processor 910 of client device 902*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and etc.

In some embodiments, client devices 902*a* through 902*n* may also include a number of external or internal devices such as a mouse, a CD-ROM, DVD, a physical or virtual keyboard, a display, or other input or output devices. In some embodiments, examples of client devices 902*a* through 902*n* (e.g., clients) may be any type of processor-based platforms that are connected to a network 906 such as, without limitation, personal computers, digital assistants, personal digital assistants, smart phones, pagers, digital tablets, laptop computers, Internet appliances, and other processor-based devices. In some embodiments, client devices 902*a* through 902*n* may be specifically programmed with one or more application programs in accordance with one or more principles/methodologies detailed herein. In some embodiments, client devices 902*a* through 902*n* may operate on any operating system capable of supporting a browser or browser-enabled application, such as Microsoft™, Windows™, and/or Linux. In some embodiments, client devices 902*a* through 902*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 902*a* through 902*n*, user 912*a*, user 912*b* through user 912*n*, may communicate over the exemplary network 906 with each other and/or with other systems and/or devices coupled to the network 906. As shown in FIG. 9, exemplary server devices 904 and 913 may include processor 905 and processor 914, respectively, as well as memory 917 and memory 916, respectively. In some embodiments, the server devices 904 and 913 may be also coupled to the network 906. In some embodiments, one or more client devices 902*a* through 902*n* may be mobile clients.

In some embodiments, at least one database of exemplary databases 907 and 915 may be any type of database, including a database managed by a database management system (DBMS). In some embodiments, an exemplary trained autoencoder 122 may be specifically programmed as an engine that controls organization, storage, management, and/or retrieval of data in the respective database. In some embodiments, the exemplary trained autoencoder 122 may be specifically programmed to provide the ability to generate a plurality of unique identification codes for the plurality of devices, compare the plurality of unique identification codes, and calculate a similarity score based on the comparison of the plurality of unique identification codes. In some embodiments, the exemplary trained autoencoder may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In some embodiments, the exemplary trained autoencoder of the present disclosure may be specifically configured to operate in a cloud computing/architecture 925 such as, but not limiting to: infrastructure a service (IaaS), platform as a service (PaaS), and/or software as a service (SaaS) using a web browser, mobile app, thin client, terminal emulator, or other endpoints.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

At least some aspects of the present disclosure will now be described with reference to the following numbered clauses.

Clause 1. A computer-implemented method including: determining, by a computing device, a plurality of risk scores of a computer network at a first time, the determining including: scanning, by the computing device, a plurality of hosts in the computer network to obtain risk information of each instance of vulnerability associated with each host during a predetermined time period, where the risk information includes a common vulnerability scoring system (CVSS) score, an exploitability measurement and a measurement parameter of identified link to one or more bad actors; calculating, by the computing device, a vulnerability risk score (VRS) for each instance of the vulnerability based on the associated risk information, where the VRS has a linear relationship with the associated CVSS score, the associated exploitability measurement and the associated measurement parameter of identified link to one or more bad actors; determining, by the computing device, a number of vulnerabilities associated with each host of the plurality of hosts in the computer network during the predetermined time period; obtaining, by the computing device, a criticality score of each host of the plurality of hosts in the computer network; obtaining, by the computing device, for each host, a representative VRS based at least in part on the VRS for each instance of vulnerability associated with the host; calculating, by the computing device, a host risk score (HRS) for each host of the plurality of hosts in the computer network based on the representative VRS, the number of vulnerabilities and the criticality score of the host, where the HRS of each host has a linear relationship with the representative VRS, the number of vulnerabilities and the criticality score; calculating, by the computing device, a network risk score (NRS) for the computer network based on the HRS of each host of the plurality of hosts in the computer network; and facilitating, by the computing device, at least one security action based on the HRS for each host and the NRS; repeating, by the computing device, the determining the risk scores at a second time; and displaying, by the computing device, the HRS and the NRS over the first and second time in a chart.

Clause 2. The method of clause 1, where each of the CVSS score, the exploitability measurement and the measurement parameter of identified link to one or more bad actors in the linear relationship with the associated VRS carries a weight.

Clause 3. The method of clause 1, where a value of either the CVSS score, the exploitability measurement or the measurement parameter of identified link to one or more bad actors is different between the first and second time.

Clause 4. The method of clause 1, where each of the representative VRS, the number of vulnerabilities and the criticality score of the host in the linear relationship with the associated HRS carries a weight.

Clause 5. The method of clause 1, where a value of either the representative VRS, the number of vulnerabilities or the criticality score of the host is different between the first and second time.

Clause 6. The method of clause 1, the representative VRS has a highest value among the VRSs of the host.

Clause 7. The method of clause 1, further including determining, by the computing device, a maximum HRS and a mean HRS in the plurality of hosts and using the maximum HRS and the mean HRS to calculate the NRS.

Clause 8. The method of clause 7, where the NRS has a linear relationship with the maximum HRS and the mean HRS, each of the maximum HRS and the mean HRS carrying a weight.

Clause 9. The method of clause 8, where a value of either the maximum HRS or the mean HRS is different between the first and second time.

Clause 10. The method of clause 1, further including storing, by the computing device, the VRS, HRS and NRS in a database.

Clause 11. The method of clause 1, further including obtaining, by the computing device, network traffic information at each host of the plurality of hosts in the computer network at the first and second time and display the network traffic information along with the HRS and NRS in the chart.

Clause 12. The method of clause 1, further including displaying, by the computing device, a topology of network with the HRS at the first time assigned to each host in the computer network.

Clause 13. A computer-implemented method including: determining, by a computing device, a plurality of risk scores of a computer network at a first time, the determining including: scanning, by the computing device, a plurality of hosts in the computer network to obtain risk information of each instance of vulnerability occurred to each host during a predetermined time period, where the risk information includes a common vulnerability scoring system (CVSS) score, an exploitability measurement and a measurement parameter of identified link to one or more bad actors; calculating, by the computing device, a vulnerability risk score (VRS) for each instance of the vulnerability based on the associated risk information, where the VRS has a linear relationship with the associated CVSS score, the associated exploitability measurement and the associated measurement parameter of identified link to one or more bad actors; determining, by the computing device, a number of vulnerabilities associated with each host of the plurality of hosts in the computer network during the predetermined time period; obtaining, by the computing device, a criticality score of each host of the plurality of hosts in the computer network; obtaining, by the computing device, for each host, a representative VRS based at least in part on the VRS for each instance of vulnerability associated with the host, the representative VRS having a highest value among the VRSs of the host; calculating, by the computing device, a host risk score (HRS) for each host of the plurality of hosts in the computer network based on the representative VRS, the number of vulnerabilities and the criticality score of the host, where the HRS of each host has a linear relationship with the representative VRS, the number of vulnerabilities and the criticality score; determining, by the computing device, a maximum HRS and a mean HRS in the plurality of hosts; and calculating, by the computing device, a network risk score (NRS) for the computer network based on the maximum HRS and the mean HRS; altering, by the computing device, at least one network security topology based on the HRS for each host and the NRS; repeating, by the computing device, the determining the risk scores at a second time; and displaying, by the computing device, the HRS and the NRS over the first and second time in a chart.

Clause 14. The method of clause 13, where each of the CVSS score, the exploitability measurement and the measurement parameter of identified link to one or more bad actors in the linear relationship with the associated VRS carries a weight.

Clause 15. The method of clause 13, where the value of either the CVSS score, the exploitability measurement or the measurement parameter of identified link to one or more bad actors is different between the first and second time.

Clause 16. The method of clause 13, where each of the representative VRS, the number of vulnerabilities and the criticality score of the host in the linear relationship with the associated HRS carries a weight.

Clause 17. The method of clause 16, where the weight of either the representative VRS, the number of vulnerabilities or the criticality score of the host is different between the first and second time.

Clause 18. The method of clause 13, where the NRS has linear relationship with the maximum HRS and the mean HRS, each carrying a weight.

Clause 19. The method of clause 18, where the value of either the maximum HRS or the mean HRS is different between the first and second time.

Clause 20. The method of clause 13, further including obtaining, by the computing device, network traffic information at each host of the plurality of hosts in the computer network at the first and second time and display the network traffic information along with the HRS and NRS in the chart.

Clause 21. A system, including: one or more processors; and a memory in communication with the one or more processors and storing instructions that, when executed by the one or more processors, cause the one or more processors to: determine a plurality of risk scores of a computer network at a first time, the determining including: scanning a plurality of hosts in the computer network to obtain risk information of each instance of vulnerability associated with each host during a predetermined time period, where the risk information includes a common vulnerability scoring system (CVSS) score, an exploitability measurement and a measurement parameter of identified link to one or more bad actors; calculating a vulnerability risk score (VRS) for each instance of the vulnerability based on the associated risk information, where the VRS has a linear relationship with the associated CVSS score, the associated exploitability measurement and the associated measurement parameter of identified link to one or more bad actors; determining a number of vulnerabilities associated with each host of the plurality of hosts in the computer network during the predetermined time period; obtaining a criticality score of each host of the plurality of hosts in the computer network; obtaining, for each host, a representative VRS based at least in part on the VRS for each instance of vulnerability associated with the host; calculating a host risk score (HRS) for each host of the plurality of hosts in the computer network based on the representative VRS, the number of vulnerabilities and the criticality score of the host, where the HRS of each host has a linear relationship with the representative VRS, the number of vulnerabilities and the criticality score; calculating a network risk score (NRS) for the computer network based on the HRS of each host of the plurality of hosts in the computer network; and facilitating at least one security action on the computer network based on the HRS for each host and the NRS; repeat the determining the risk scores at a second time; and display the HRS and the NRS over the first and second time in a chart.

Clause 22. The system of clause 21, where each of the CVSS score, the exploitability measurement and the measurement parameter of identified link to one or more bad actors in the linear relationship with the associated VRS carries a weight.

Clause 23. The system of clause 21, where a value of either the CVSS score, the exploitability measurement or the measurement parameter of identified link to one or more bad actors is different between the first and second time.

Clause 24. The system of clause 21, where each of the representative VRS, the number of vulnerabilities and the criticality score of the host in the linear relationship with the associated HRS carries a weight.

Clause 25. The system of clause 21, where a value of either the representative VRS, the number of vulnerabilities or the criticality score of the host is different between the first and second time.

Clause 26. The system of clause 21, where the representative VRS has a highest value among the VRSs of the host.

Clause 27. The system of clause 21, where the instructions, when executed by the one or more processors further cause the one or more processors to determine a maximum HRS and a mean HRS in the plurality of hosts and use the maximum HRS and the mean HRS to calculate the NRS.

Clause 28. The system of clause 21, where the instructions, when executed by the one or more processors further cause the one or more processors to obtain network traffic information at each host of the plurality of hosts in the computer network at the first and second time and display the network traffic information along with the HRS and NRS in the chart.

Clause 29. The system of clause 21, where the instructions when executed by the one or more processors, further cause the one or more processors to store the VRS, HRS and NRS in a database.

Clause 30. A system, including: one or more processors; and a memory in communication with the one or more processors and storing instructions that, when executed by the one or more processors, cause the one or more processors to: determine a plurality of risk scores of a computer network at a first time, the determining including: scanning a plurality of hosts in the computer network to obtain risk information of each instance of vulnerability occurred to each host during a predetermined time period, where the risk information includes a common vulnerability scoring system (CVSS) score, an exploitability measurement and a measurement parameter of identified link to one or more bad actors; calculating a vulnerability risk score (VRS) for each instance of the vulnerability based on the associated risk information, where the VRS has a linear relationship with the associated CVSS score, the associated exploitability measurement and the associated measurement parameter of identified link to one or more bad actors; determining a number of vulnerabilities associated with each host of the plurality of hosts in the computer network during the predetermined time period; obtaining a criticality score of each host of the plurality of hosts in the computer network; obtaining for each host, a representative VRS based at least in part on the VRS for each instance of vulnerability associated with the host, the representative VRS having a highest value among the VRSs of the host; calculating a host risk score (HRS) for each host of the plurality of hosts in the computer network based on the representative VRS, the number of vulnerabilities and the criticality score of the host, where the HRS of each host has a linear relationship with the representative VRS, the number of vulnerabilities and the criticality score; determining a maximum HRS and a mean HRS in the plurality of hosts; and calculating a network risk score (NRS) for the computer network based on the maximum HRS and the mean HRS; altering at least one network security topology based on the HRS for each host and the NRS; repeat the determining the risk scores at a second time; and display the HRS and the NRS over the first and second time in a chart.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A computer-implemented method comprising:
   determining, by a computing device, a plurality of risk scores of a computer network at a first time, the determining comprising:
   scanning, by the computing device, a plurality of hosts in the computer network to obtain risk information of each instance of vulnerability associated with each host during a predetermined time period, wherein the risk information comprises a common vulnerability scoring system (CVSS) score, an exploitability measurement and a measurement parameter of identified link to one or more bad actors;
   calculating, by the computing device, a vulnerability risk score (VRS) for each instance of the vulnerability based on the associated risk information, wherein the VRS has a linear relationship with the associated CVSS score, the associated exploitability measurement and the associated measurement parameter of identified link to one or more bad actors;
   determining, by the computing device, a number of vulnerabilities associated with each host of the plurality of hosts in the computer network during the predetermined time period;
   obtaining, by the computing device, a criticality score of each host of the plurality of hosts in the computer network;
   obtaining, by the computing device, for each host, a representative VRS based at least in part on the VRS for each instance of vulnerability associated with the host;
   calculating, by the computing device, a host risk score (HRS) for each host of the plurality of hosts in the computer network based on the representative VRS, the number of vulnerabilities and the criticality score of the host, wherein the HRS of each host has a linear relationship with the representative VRS, the number of vulnerabilities and the criticality score;
   calculating, by the computing device, a network risk score (NRS) for the computer network based on the HRS of each host of the plurality of hosts in the computer network; and
   facilitating, by the computing device, at least one security action based on the HRS for each host and the NRS;
   repeating, by the computing device, the determining the risk scores at a second time; and
   displaying, by the computing device, the HRS and the NRS over the first and second time in a chart.

2. The method of claim 1, wherein each of the CVSS score, the exploitability measurement and the measurement parameter of identified link to one or more bad actors in the linear relationship with the associated VRS carries a weight.

3. The method of claim 1, wherein a value of either the CVSS score, the exploitability measurement or the measurement parameter of identified link to one or more bad actors is different between the first and second time.

4. The method of claim 1, wherein each of the representative VRS, the number of vulnerabilities and the criticality score of the host in the linear relationship with the associated HRS carries a weight.

5. The method of claim 1, wherein a value of either the representative VRS, the number of vulnerabilities or the criticality score of the host is different between the first and second time.

6. The method of claim 1, the representative VRS has a highest value among the VRSs of the host.

7. The method of claim 1, further comprising determining, by the computing device, a maximum HRS and a mean HRS in the plurality of hosts and using the maximum HRS and the mean HRS to calculate the NRS.

8. The method of claim 7, wherein the NRS has a linear relationship with the maximum HRS and the mean HRS, each of the maximum HRS and the mean HRS carrying a weight.

9. The method of claim 8, wherein a value of either the maximum HRS or the mean HRS is different between the first and second time.

10. The method of claim 1, further comprising storing, by the computing device, the VRS, HRS and NRS in a database.

11. The method of claim 1, further comprising obtaining, by the computing device, network traffic information at each host of the plurality of hosts in the computer network at the first and second time and display the network traffic information along with the HRS and NRS in the chart.

12. The method of claim 1, further comprising displaying, by the computing device, a topology of network with the HRS at the first time assigned to each host in the computer network.

13. A computer-implemented method comprising:
  determining, by a computing device, a plurality of risk scores of a computer network at a first time, the determining comprising:
    scanning, by the computing device, a plurality of hosts in the computer network to obtain risk information of each instance of vulnerability occurred to each host during a predetermined time period, wherein the risk information comprises a common vulnerability scoring system (CVSS) score, an exploitability measurement and a measurement parameter of identified link to one or more bad actors;
    calculating, by the computing device, a vulnerability risk score (VRS) for each instance of the vulnerability based on the associated risk information, wherein the VRS has a linear relationship with the associated CVSS score, the associated exploitability measurement and the associated measurement parameter of identified link to one or more bad actors;
    determining, by the computing device, a number of vulnerabilities associated with each host of the plurality of hosts in the computer network during the predetermined time period;
    obtaining, by the computing device, a criticality score of each host of the plurality of hosts in the computer network;
    obtaining, by the computing device, for each host, a representative VRS based at least in part on the VRS for each instance of vulnerability associated with the host, the representative VRS having a highest value among the VRSs of the host;
    calculating, by the computing device, a host risk score (HRS) for each host of the plurality of hosts in the computer network based on the representative VRS, the number of vulnerabilities and the criticality score of the host, wherein the HRS of each host has a linear relationship with the representative VRS, the number of vulnerabilities and the criticality score;
    determining, by the computing device, a maximum HRS and a mean HRS in the plurality of hosts; and
    calculating, by the computing device, a network risk score (NRS) for the computer network based on the maximum HRS and the mean HRS;
  altering, by the computing device, at least one network security topology based on the HRS for each host and the NRS;
  repeating, by the computing device, the determining the risk scores at a second time; and
  displaying, by the computing device, the HRS and the NRS over the first and second time in a chart.

14. The method of claim 13, wherein each of the CVSS score, the exploitability measurement and the measurement parameter of identified link to one or more bad actors in the linear relationship with the associated VRS carries a weight.

15. The method of claim 13, wherein the value of either the CVSS score, the exploitability measurement or the measurement parameter of identified link to one or more bad actors is different between the first and second time.

16. The method of claim 13, wherein each of the representative VRS, the number of vulnerabilities and the criticality score of the host in the linear relationship with the associated HRS carries a weight.

17. The method of claim 16, wherein the weight of either the representative VRS, the number of vulnerabilities or the criticality score of the host is different between the first and second time.

18. The method of claim 13, wherein the NRS has linear relationship with the maximum HRS and the mean HRS, each carrying a weight.

19. The method of claim 18, wherein the value of either the maximum HRS or the mean HRS is different between the first and second time.

20. The method of claim 13, further comprising obtaining, by the computing device, network traffic information at each host of the plurality of hosts in the computer network at the first and second time and display the network traffic information along with the HRS and NRS in the chart.

21. A system, comprising:
  one or more processors; and
  a memory in communication with the one or more processors and storing instructions that, when executed by the one or more processors, cause the one or more processors to:
    determine a plurality of risk scores of a computer network at a first time, the determining comprising:
      scanning a plurality of hosts in the computer network to obtain risk information of each instance of vulnerability associated with each host during a predetermined time period, wherein the risk information comprises a common vulnerability scoring system (CVSS) score, an exploitability measurement and a measurement parameter of identified link to one or more bad actors;
      calculating a vulnerability risk score (VRS) for each instance of the vulnerability based on the associated risk information, wherein the VRS has a linear relationship with the associated CVSS score, the associated exploitability measurement and the associated measurement parameter of identified link to one or more bad actors;
      determining a number of vulnerabilities associated with each host of the plurality of hosts in the computer network during the predetermined time period;
      obtaining a criticality score of each host of the plurality of hosts in the computer network;
      obtaining, for each host, a representative VRS based at least in part on the VRS for each instance of vulnerability associated with the host;
      calculating a host risk score (HRS) for each host of the plurality of hosts in the computer network based on the representative VRS, the number of vulnerabilities and the criticality score of the host, wherein the HRS of each host has a linear relationship with the representative VRS, the number of vulnerabilities and the criticality score;
      calculating a network risk score (NRS) for the computer network based on the HRS of each host of the plurality of hosts in the computer network; and
      facilitating at least one security action on the computer network based on the HRS for each host and the NRS;
    repeat the determining the risk scores at a second time; and
    display the HRS and the NRS over the first and second time in a chart.

22. The system of claim 21, wherein each of the CVSS score, the exploitability measurement and the measurement parameter of identified link to one or more bad actors in the linear relationship with the associated VRS carries a weight.

23. The system of claim 21, wherein a value of either the CVSS score, the exploitability measurement or the measurement parameter of identified link to one or more bad actors is different between the first and second time.

24. The system of claim 21, wherein each of the representative VRS, the number of vulnerabilities and the criticality score of the host in the linear relationship with the associated HRS carries a weight.

25. The system of claim 21, wherein a value of either the representative VRS, the number of vulnerabilities or the criticality score of the host is different between the first and second time.

26. The system of claim 21, wherein the representative VRS has a highest value among the VRSs of the host.

27. The system of claim 21, wherein the instructions, when executed by the one or more processors further cause the one or more processors to determine a maximum HRS and a mean HRS in the plurality of hosts and use the maximum HRS and the mean HRS to calculate the NRS.

28. The system of claim 21, wherein the instructions, when executed by the one or more processors further cause the one or more processors to obtain network traffic information at each host of the plurality of hosts in the computer network at the first and second time and display the network traffic information along with the HRS and NRS in the chart.

29. The system of claim 21, wherein the instructions when executed by the one or more processors, further cause the one or more processors to store the VRS, HRS and NRS in a database.

30. A system, comprising:
one or more processors; and
a memory in communication with the one or more processors and storing instructions that, when executed by the one or more processors, cause the one or more processors to:
determine a plurality of risk scores of a computer network at a first time, the determining comprising:
scanning a plurality of hosts in the computer network to obtain risk information of each instance of vulnerability occurred to each host during a predetermined time period, wherein the risk information comprises a common vulnerability scoring system (CVSS) score, an exploitability measurement and a measurement parameter of identified link to one or more bad actors;
calculating a vulnerability risk score (VRS) for each instance of the vulnerability based on the associated risk information, wherein the VRS has a linear relationship with the associated CVSS score, the associated exploitability measurement and the associated measurement parameter of identified link to one or more bad actors;
determining a number of vulnerabilities associated with each host of the plurality of hosts in the computer network during the predetermined time period;
obtaining a criticality score of each host of the plurality of hosts in the computer network;
obtaining for each host, a representative VRS based at least in part on the VRS for each instance of vulnerability associated with the host, the representative VRS having a highest value among the VRSs of the host;
calculating a host risk score (HRS) for each host of the plurality of hosts in the computer network based on the representative VRS, the number of vulnerabilities and the criticality score of the host, wherein the HRS of each host has a linear relationship with the representative VRS, the number of vulnerabilities and the criticality score;
determining a maximum HRS and a mean HRS in the plurality of hosts; and
calculating a network risk score (NRS) for the computer network based on the maximum HRS and the mean HRS;
altering at least one network security topology based on the HRS for each host and the NRS;
repeat the determining the risk scores at a second time; and
display the HRS and the NRS over the first and second time in a chart.

\* \* \* \* \*